United States Patent [19]

Michalko

[11] 3,926,849

[45] Dec. 16, 1975

[54] METHOD OF CATALYST MANUFACTURE

[75] Inventor: Edward Michalko, Chicago, Ill.

[73] Assignee: Universal Oil Products Company, Des Plaines, Ill.

[22] Filed: June 10, 1974

[21] Appl. No.: 478,115

[52] U.S. Cl. ............... 252/448; 252/442; 252/463; 252/466 PT
[51] Int. Cl.$^2$. B01J 37/00; B01J 21/04; B01J 23/14
[58] Field of Search............... 252/448, 463, 466 PT

[56] References Cited
UNITED STATES PATENTS 3,740,328  6/1973  Rausch.......................... 252/466 PT
3,779,947  12/1973  Mitsche et al. ............... 252/466 PT Primary Examiner—W. J. Shine
Attorney, Agent, or Firm—James R. Hoatson, Jr.; Robert W. Welch; William H. Page, II

[57] ABSTRACT

A method of catalyst manufacture. Stannic chloride is partially hydrolyzed, admixed with an alumina sol, and the mixture gelled to form a tin-containing alumina suitable for use as a catalyst or as a catalyst support or carrier material. The method is particularly useful in the manufacture of a reforming catalyst comprising a platinum component impregnated on an alumina carrier material comprising up to about 30 wt. percent tin as stannic oxide.

7 Claims, No Drawings

METHOD OF CATALYST MANUFACTURE

The reforming of gasoline boiling range feed stocks to improve the octane rating thereof is a process well known to the petroleum industry. The feed stock may be a full boiling range gasoline fraction, although it is more often what is commonly called naphtha -- a gasoline fraction characterized by an initial boiling point of from about 65° to about 120°C. and an end boiling point of from about 175° to about 220°C.

The reforming of gasoline boiling range feed stocks is generally recognized as involving a number of octane-improving hydrocarbon conversion reactions requiring a multi-functional catalyst. In particular, the catalyst is designed to effect several octane-improving reactions with respect to paraffins and naphthenes -- the feed stock components that offer the greatest potential for octane improvement. Thus, the catalyst is designed to effect isomerization, dehydrogenation, dehydrocyclization and hydrocracking of paraffins. Of these hydrocarbon conversion reactions, dehydrocylization produces the greatest gain in octane value and is therefore a favored reaction. For naphthenes, the principal octane-improving reactions involve dehydrogenation and ring isomerization to yield aromatics of improved octane value. With most naphthenes being in the 65-80 F-1 clear octane range, the octane improvement, while substantial, is not as dramatic as in the case of the lower octane paraffins. Reforming operations thus employ a multifunctional catalyst designed to provide the most favorable balance between the aforementioned octane-improving reactions to yield a product of optimum octane value, said catalyst having at least one metallic dehydrogenation component and an acid-acting hydrocracking component.

However, even with the achievement of the desired balance between the octane-improving reactions, problems persist relating principally to undesirable side reactions, which, although minimal, cumulatively contribute to carbon formation, catalyst instability and product loss. Thus, demethylation occurs with the formation of excess methane; excessive hydrocracking produces light gases; cleavage or ring opening of naphthenes results in the formation of low octane, straight-chain hydrocarbons; condensation of aromatics forms coke precursors and carbonaceous deposits; and the acid catalyzed polymerization of olefins and other polymerizable materials yields high molecular weight hydrocarbons subject to dehydrogenation and further formation of carbonaceous matter.

Accordingly, an effective reforming operation is dependent on the proper selection of catalyst and process variables to minimize the effect of undesirable side reactions for a particular hydrocarbon feed stock. However, the selection is complicated by the fact that there is an interrelation between reaction conditions relating to undesirable side reactions and desirable octane-improving reactions. Reaction conditions selected to optimize a particular octane-improving reaction may, and often do, also promote one or more undesirable side reactions. For example, as previously indicated, some hydrocracking is desirable since it produces lower boiling hydrocarbons of higher octane value than the parent hydrocarbons. But hydrocracking of the lower $C_6$-$C_8$ constituents is not desirable since it produces still lower boiling hydrocarbons, such as butene, which are of marginal utility. It is this type of hydrocracking that is referred to as excessive hydrocracking and to be avoided. The extent and kind of hydrocracking is controlled by careful regulation of the acid-acting component of the catalyst and by the use of low hydrogen partial pressures. The latter follows from the fact that the hydrocracking reaction consumes hydrogen and the reaction can therefore be controlled by limiting hydrogen concentration in the reaction media. Low hydrogen partial pressures have a further advantage in that the main octane-improving reactions, i.e., dehydrogenation of paraffins and naphthenes, are net producers of hydrogen and, as such, favored by low hydrogen pressures.

Catalysts comprising a supported platinum group metal, for example platinum supported on alumina, are widely known for their selectivity in the production of high octane aromatics, general activity with respect to each of the several octane-improving reactions which make up the reforming operation, and for their stability at reforming conditions. One of the principal objections to low pressure reforming relates to its effect on catalyst stability. This stems from the fact that low pressure operation tends to favor the aforementioned condensation and polymerization reactions believed to be the principal reactions involved in the formation of coke presursors and carbon deposits so detrimental to catalyst stability.

More recently, the industry has turned to certain multi-component or bi-metallic catalysts to make low pressure reforming, and all the advantages attendant therewith, a reality. In particular, catalysts comprising a platinum component in combination with a tin component and an alumina carrier material have shown exceptional activity, selectivity and stability, and it is an object of this invention to present a novel method for the manufacture of such catalysts.

In one of its broad aspects, the present invention embodies a method of catalyst manufacture which comprises (a) commingling sufficient ammonia with stannic chloride in aqueous solution to provide a soluble, partial hydrolysis product of said stannic chloride; (b) admixing the partial hydrolysis product with an alumina sol; (c) commingling the tin-containing sol with a weak base which is substantially stable at normal temperatures but hydrolyzable to ammonia with increasing temperature; (d) dispersing the mixture as droplets in a hot oil bath effecting hydrolysis of said base and formation of spheroidal gel particles and aging said gel particles in said oil bath at a temperature of from about 90° to about 150°C. for a period of from about 1 to about 24 hours; and (e) washing, drying and calcining the tin-containing alumina spheres.

One of the more specific embodiments of this invention relates to the aforesaid method of manufacturing tin-containing alumina spheres, and to the further impregnation thereof with a platinum group metal component.

Other objects and embodiments of this invention will become apparent in the following detailed specification.

The alumina sol utilized in the present method of catalyst manufacture is preferably such as results from the hydrolysis of an acid salt of aluminum in aqueous solution followed or accompanied by a reduction in the acid anion concentration of the solution. The olation reaction resulting from the reduced concentration of acid anions promotes the formation of aluminum hydroxychloride polymers of colloidal dimension dispersed and suspended in the remaining liquid. A suitable acid salt of aluminum includes such as the chlorides, sulfates, nitrates, acetates, etc. Reduction of said acid anion concentration may be accomplished in any conventional or otherwise convenient manner. For example, an aqueous aluminum chloride solution can be subjected to hydrolysis utilizing an electrolytic cell with a porous partition between the anode and cathode whereby an acid anion deficiency is created in the cathode compartment with the formation of the desired sol. In some cases, as with an aqueous aluminum acetate solution, where the acid anion is sufficiently volatile, the desired reduction in anion concentration can be effected simply by heating. A particularly suitable method of preparing a sol precursor of the preferred alumina carrier material involves the use of aluminum metal as a neutralizing agent in conjunction with, for example, an aqueous aluminum chloride solution. In this instance, the salt of neutralization is itself a hydrolyzable aluminum salt subject to ultimate sol formation.

One convenient and preferred method, particularly suitable for the preparation of an alumina sol, comprises digesting aluminum pellets or slugs in aqueous hydrochloric acid, and reducing the chloride anion concentration of the resulting aluminum chloride solution through the use of an excess of the aluminum reactant as a neutralizing agent. The described sols are preferably prepared to contain less than about 14 wt. percent aluminum, preferably from about 12 to about 14 wt. percent, with an aluminum/chloride atom ratio of from about 1:1 to about 2:1. Generally, such sols will contain from about 8 to about 12 wt. percent chloride.

In the manufacture of a tin-containing alumina support or carrier material it has been the practice to solubilize a tin compound in the acidic alumina sol, the tin compound being subsequently converted to stannic oxide. An acid salt of tetravalent tin is most suitable, for example, stannic chloride, stannic fluoride, stannic iodide, stannic sulfate, stannic chromate, stannic tartrate, and the like. Stannic chloride is highly soluble in the sol to achieve a better distribution of the tin component in the final product, and has been a preferred tin compound. However, with the addition of increasing amounts of stannic chloride, the acidity of the sol is increased and, in the attempted preparation of spheres containing in excess of about 15 wt. percent stannic oxide, the acidity of the sol is such as to preclude gelatin and formation of hydrogel spheres. It has now been found that alumina particles containing up to about 30 wt. percent stannic oxide can be prepared by the device of preneutralizing the stannic chloride prior to adding the same to the acidic alumina sol. The preneutralized stannic chloride herein contemplated is a partially hydrolyzed stannic chloride. The partial hydrolysis is suitably accomplished by commingling ammonium hydroxide and stannic chloride in a mole ratio of up to about 3.5:1 and stirring the same until a solution is obtained. Up to about 87 percent neutralization of the stannic chloride can be effected without adverse effect on its solubility in the alumina sol. The partial hydrolysis is conveniently accomplished in aqueous solution, usually by the addition of a dilute ammonium hydroxide solution (approximately 15% $NH_3$) to a dilute stannic chloride solution. The ammonia is used in an amount to effect from about 50 to about 87 percent neutralization of the stannic chloride. The preneutralized stannic chloride herein contemplated may be described as stannic chloride wherein an average of up to about 3.5 of the 4 chloride anions have been replaced with hydroxyl radicals. By virtue of the acquired hydroxyl groups, the preneutralized stannic chloride becomes more closely associated with the alumina sol to yield a more uniform composite. In any case, the preneutralized stannic chloride of this invention is unique in that it remains soluble in the acidic alumina sol although up to about 87 percent of chloride associated therewith has been neutralized by substitution with hydroxyl radicals.

Gelation of the sol, containing the tin component dispersed therein, is preferably effected under conditions to yield a gel composite having a surface area of from about 25 to about 500 $m^2/gms$. The tin-containing alumina particles are preferably prepared with an average bulk density of from about 0.30 to about 0.70 gms/cc, and surface area characteristics such that the average pore diameter is from about 20 to about 300 Ang.; the average pore volume is from about 0.10 to about 1.0 cc/gm; and the total surface area is from about 100 to about 500 $m^2/gm$. In general, the best results are obtained with spheroidal particles of about one sixteenth inch diameter, comprising gamma-alumina, and having an average bulk density of about 0.5 gms/cc, a pore volume of about 0.4 cc/gm, and a surface area of about 175 $m^2/gm$.

A preferred method for effecting gelatin which affords a convenient means of developing the desired physical characteristics relates to the well-known oil-drop method substantially as described by J. Hoekstra in U.S. Pat. No. 2,620,314. Accordingly, the tin-containing sol is admixed with a gelling agent at below gelation temperature, and the resulting mixture is dispersed as droplets in a hot oil bath whereby gelation occurs with the formation of firm spherical gel particles. The spherical gel particles are thereafter subjected to one or more aging treatments whereby desirable physical characteristics are imparted thereto. The gelling agent is suitably a weakly basic material substantially stable at normal temperatures but hydrolyzable to ammonia with increasing temperature. hexamethylenetetramine is described as a most suitable gelling agent. Thus, the solhexamethylenetetramine mixture is dispersed as droplets, while still below gelation temperature, into the oil suspending medium which is maintained at an elevated temperature effecting hydrolysis of the hexamethylenetetramine and gelatin of the tin-containing sol into firm spherical gel particles. The hexamethylenetetramine is suitably utilized in an amount to effect substantially complete neutralization of the acid anion, e.g. chloride anion, content of the sol. Only a fraction of a hexamethylenetetramine is hydrolyzed or decomposed in the relatively short period during which initial gelation occurs. During the subsequent aging process, the hexamethylenetetramine retained in the spheres continues to hydrolyze to ammonia, carbon dioxide and amines, effecting further polymerization whereby the pore characteristics of the carrier material are established. Typically, the gelled particles are aged in the oil bath for from about 1 to about 24 hours at a temperature of from about 90° to about 150°C. and at pressures ranging from atmospheric to about 150 psig. When oil-aged under atmospheric conditions, the gelled particles are generally further aged in a dilute aqueous ammoniacal solution for 2–4 hours. In any case, the aged particles are subsequently water-washed, dried and calcined.

As previously stated, the foregoing method affords a convenient means of developing desired physical characteristics. The method includes a number of process variables which effect the spherical gel product. Generally, the metals/acid anion ratio of the sol will influence the average bulk density of the gel product and, correspondingly, the pore diameter and pore volume characteristics attendant therewith -- lower ratios tending toward higher average bulk densities. Other process variables effecting physical properties include the time, temperature and pH at which the gel particles are aged. usually, temperatures in the lower range and shorter aging periods tend toward higher average bulk densities. Surface area is normally a function of calcination temperature, a temperature of from about 425° to about 815°C. being suitably employed.

Although the present invention is directed to the manufacture of catalysts containing a platinum group metal, i.e. platinum, palladium, rhodium, ruthenium, osmium and iridium, platinum is a preferred catalyst component. The platinum group metal component is incorporated in the catalyst composite utilizing impregnating techniques known to the art. For example, the tin-containing alumina carrier material is suspended, dipped, soaked, or otherwise immersed in an aqueous solution of a soluble platinum group metal compound. Suitable compounds include platinum chloride, chloroplatinic acid, ammonium chloroplatinate, dinitrodiamino platinum, palladium chloride, chloropalladic acid, and the like. Utilization of a platinum group metal combined with halogen, such as chloroplatinic acid, is preferred as it facilitates incorporation of the platinum group metal component as well as the desired halogen component. Hydrogen chloride is also generally added to the impregnating solution to further facilitate incorporation of both the platinum group metal and the halogen component in the catalyst composite. The tin-containing carrier material is preferably maintained in contact with the impregnating solution at ambient temperature conditions for a brief period, preferably for at least about 30 minutes, and the impregnating solution thereafter evaporated substantially to dryness. For example, a volume of tin-containing alumina particles is immersed in a substantially equal volume of impregnating solution in a steam jacketed rotary dryer and tumbled therein for a brief period at about room temperature. Steam is thereafter applied to the dryer jacket to expedite evaporation of the impregnating solution and recovery of substantially dry impregnated material. Following impregnation, the resulting impregnated material is subjected to a high temperature calcination or oxidation technique hereinafter described.

Although it is not essential, it is preferred to incorporate a halogen component into the catalytic composite of the present invention. Although the precise form of the chemistry of the association of the halogen component with the carrier material is not entirely known, it is customary in the art to refer to the halogen component as being combined with the carrier material, or with the other ingredients of the catalyst. This combined halogen may be either chlorine, fluorine, iodine, bromine, or mixtures thereof. Of these fluorine, and particularly, chlorine are preferred for the purposes of the present invention. The halogen may be added to the carrier material in any suitable manner, either during the preparation of the support or before or after the addition of the other components thereto. For example, the halogen may be added at any stage of the preparation of the carrier material or to the calcined carrier material, as an aqueous solution of an acid such as hydrogen fluoride, hydrogen chloride, hydrogen bromide, etc. The halogen component or a portion thereof may be composited with the carrier material during the impregnation of the latter with the platinum group components; for example, through utilization of a mixture of chloroplatinic acid and hydrogen chloride as heretofore mentioned. In another situation, the alumina which is typically utilized to form the preferred alumina carrier material will contain halogen and thus contribute at least a portion of the halogen component to the final composite. For reforming, the halogen will be typically combined with the carrier material in an amount sufficient to result in the final composite that contains from about 0.1 to about 1.5 wt. percent and preferably from about 0.5 to about 1.2 wt. percent halogen calculated on an elemental basis. For isomerization or hydrocracking, it is generally preferred to utilize relatively larger amounts of halogen in the catalyst — typically up to about 10 wt. percent halogen calculated on an elemental basis, and more particularly from about 1.0 to about 5.0 wt. percent.

With regard to the amount of the tin component contained in the catalyst, it is preferably from about 0.01 to about 5.0 wt. percent stannic oxide although it is within the scope of the present invention to prepare catalyst up to about 30 wt. percent stannic oxide. Regardless of the absolute amounts of the tin component and the platinum group metal component utilized, the atomic ratio of the platinum group metal to the tin metal contained in the catalyst is preferably selected from the range of about 0.1:1 to about 3:1 with best results achieved at an atomic ratio of about 0.5:1 to about 1.5:1. This is particularly true when the total content of the tin component plus the platinum group metal component in the catalytic composite is fixed in the range of from about 0.15 to about 2.0 wt. percent thereof, calculated on an elemental tin and platinum group metal basis.

The final catalyst composite generally will be dried at a temperature of from about 95° to about 315°C. over a period of from about 2 to about 24 hours or more, and finally calcined at a temperature of from about 370° to about 595°C. in an air atmosphere for a period of from about 0.5 to about 10 hours in order to convert the metallic components substantially to the oxide form. In the case where a halogen component is utilized in the catalyst, best results are generally obtained when the halogen content of the catalyst is adjusted during the calcination step by including a halogen or a halogen-containing compound in the air atmosphere utilized. In particular, when the halogen component of a catalyst is chlorine, it is preferred to use a mole ratio of $H_2O:HCl$ of from about 20:1 to about 100:1 during at least a portion of the calcination step in order to adjust the final chlorine content of the catalyst to a range of from about 0.5 to about 1.2 wt. percent.

While not essential, it is preferred that the resultant calcined catalytic composite be subjected to a substantially water-free reduction step prior to its use in the conversion of hydrocarbons. This step is designed to insure a uniform and finely divided dispersion of the metallic components throughout the carrier material. Preferably, substantially pure and dry hydrogen (i.e., less than 20 volume ppm $H_2O$) is used as the reducing agent in this step. The reducing agent is contacted with the calcined catalyst at a temperature of from about 425° to about 650°C. and for a period of from about 0.5 to about 10 hours or more effective to substantially reduce both metallic components to their elemental state. This reduction treatment may be performed in situ as part of a start-up sequence if precautions are taken to predry the plant to a substantially water-free state and if substantially water-free hydrogen is used.

The reduced catalytic composite may, in some cases, be beneficially subjected to a presulfiding operation designed to incorporate in the catalytic composite from about 0.05 to about 0.50 wt. percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 10° to about 595°C. or more. It is generally a good practice to perform this presulfiding step under substantially water-free conditions.

Reforming of gasoline feed stocks in contact with the catalyst of this invention as herein contemplated, is suitably effected at a pressure of from about 50 to about 1000 psig and at a temperature of from about 425° to about 595°C. The catalyst of this invention permits a stable operation to be carried out in a preferred pressure range of from about 50 to about 350 psig. In fact, the stability exhibited by the catalyst of this invention is equivalent to or greater than has heretofore been observed with respect to prior art reforming catalyst at relatively low pressure reforming conditions. Similarly, the temperature required is generally lower than required for a similar reforming operation utilizing prior art reforming catalysts. Preferably, the temperature employed is in the range of from about 480° to about 565°C. It is well known in the art that the initial temperature selection is made primarily as a function of the desired octane rating of the product, and the temperature is subsequently adjusted upwardly during the reforming operation to compensate for the inevitable catalyst deactivation that occurs and to provide a constant octane product. It is a feature of the present invention that the required rate of temperature increase to maintain a constant octane product is substantially lower than is required with prior art catalysts including prior art tin-platinum catalysts.

Although the catalyst composition of this invention is most suitable for reforming, it may be used to promote other reactions including dehydrogenation of specific hydrocarbons or hydrocarbon fractions, isomerization of specific hydrocarbons or hydrocarbon fractions, destructive hydrogenation or hydrocracking of larger hydrocarbon molecules such as those occurring in the kerosene and gas oil boiling range, and the oxidation of hydrocarbons to produce first, second and third stage oxidation products. Reaction conditions employed in the various hydrocarbon conversion reactions are those heretofore practiced in the art. For example, alkylaromatic isomerization reaction conditions include a temperature of from about 32° to about 1000°F., a pressure of from about atmospheric to about 1500 psig, a hydrogen to hydrocarbon mole ratio of from about 0.5:1 to about 20:1 and a LHSV of from about 0.5 to about 20. Likewise, typical hydrocracking reaction conditions include a pressure of from about 500 to about 3000 psig, a temperature of from about 390° to about 935°F., a LHSV of from about 0.1 to about 10, and a hydrogen circulation rate of from about 1000 to about 10,000 SCF/BBl (standard cubic feet per barrel of charge).

The following example is presented in illustration of the method of this invention and is not intended as an undue limitation on the generally broad scope of the invention as set out in the appended claims.

EXAMPLE

An alumina sol was prepared by digesting substantially pure aluminum pellets in aqueous hydrochloric acid solution utilizing an excess of aluminum as a neutralizing agent. The sol had an aluminum/chloride ratio of 1.40 and contained 280 grams of $Al_2O_3$. A preneutralized stannic chloride solution was separately prepared by the addition of 280 cubic centimeters of a 15% aqueous ammonia solution to a rapidly stirred solution of 280 grams of $SnCl_4.5H_2O$ and 300 cc of water. Thereafter the clear preneutralized stannic chloride solution (72 percent neutralized) was blended with 776 cubic centimeters of alumina sol, and 1600 cubic centimeters of a 28% aqueous hexamethylenetetramine solution added thereto. The mixture was subsequently dispersed as droplets in a hot (90°C.) oil bath to form spheroidal gel particles comprising tin and alumina. The spheroidal particles were aged in the hot oil bath for 1.5 hours at 150°C. and 100 psig, washed with a dilute ammoniacal solution, and oven dried at 110° C. The dried particles were heated to about 650°C. and calcined in air at this temperature for 2 hours. The spheroidal gel particles were about 1/16 inch diameter and had an average bulk density of 0.49 grams per cubic centimeter. About 350 cubic centimeters of the calcined particles were immersed in 350 cubic centimeters of impregnating solution containing 131 cubic centimeters of aqueous chloroplatinic acid (10 mg of Pt/cc) and 8.4 cubic centimeters of concentrated hydrochloric acid. the solution was then evaporated to dryness in contact with the spheres utilizing a rotary steam evaporator. The dried particles were calcined by heating at about 150°C. in air for 1 hour, and then at 525°C. for 1 hour. The spheres were thereafter dried in contact with a stream of air containing $H_2O$ and HCl in a 40:1 mole ratio at 525°C. for 4 hours. After a nitrogen purge, the calcined particles were reduced in hydrogen at 550°C. for 1 hour. The final catalyst composition contained 0.75 wt. % platinum and 0.85 wt. % chloride supported on a composite comprising 30 wt. % $SnO_2$ and 70 wt. % $Al_2O_3$.

I claim as my invention:

1. A method of catalyst manufacture which comprises:
   a. commingling sufficient ammonia with an acid salt of tetravalent tin in aqueous solution to effect from about 50 to about 87 percent neutralization of said acid salt;
   b. admixing the resultant neutralization product with an alumina sol;
   c. commingling the tin-containing sol with hexamethylenetretramine;
   d. dispersing the mixture as droplets in a hot oil bath effecting hydrolysis of said hexamethylenetretamine and the formation of spheroidal gel particles and aging said gel particles in said oil bath at a temperature of from about 90° to about 150°C. for a period of from about 1 to about 24 hours; and
   e. washing, drying and calcining said particles in an oxidizing atmosphere to yield a spheroidal $SnO_2$-$Al_2O_3$ composite.

2. The method of claim 1 further characterized with respect to step (a) in that said acid salt of tin is stannic chloride.

3. The method of claim 1 further characterized with respect to step (a) in that said acid salt of tin is utilized in an amount to provide a $SnO_2\text{-}Al_2O_3$ composite containing from about 0.01 to about 30 wt. % $SnO_2$.

4. The method of claim 1 further characterized with respect to step (b) in that said alumina sol is prepared by digesting aluminum in aqueous hydrochloric acid and reducing the chloride anion concentration of the mixture by utilizing an excess of said aluminum as a neutralizing agent.

5. The method of claim 2 further characterized with respect to step (a) in that the ammonia and stannic chloride are commingled in a mole ratio of up to 3.5:1.

6. The method of claim 3 further characterized in that said $SnO_2\text{-}Al_2O_3$ composite is impregnated with a platinum group metal compound thermally decomposable to the metal oxide, and drying and calcining the thus impregnated composite.

7. The method of claim 6 further characterized in that said platinum group metal compound is chloroplatinic acid.

* * * * *